Nov. 28, 1950 — H. R. RICARDO — 2,531,788
STARTING MECHANISM FOR INTERNAL-COMBUSTION ENGINES
Filed March 30, 1948 — 2 Sheets-Sheet 2

Inventor
H. R. Ricardo
By
Watson, Cole, Grindle & Watson
Attorney

Patented Nov. 28, 1950

2,531,788

UNITED STATES PATENT OFFICE 2,531,788

STARTING MECHANISM FOR INTERNAL-COMBUSTION ENGINES

Harry Ralph Ricardo, London, England

Application March 30, 1948, Serial No. 17,957
In Great Britain July 23, 1947

3 Claims. (Cl. 123—179)

This invention relates to internal combustion engines of the kind in which the engine has apparatus for rotating its rotary parts for starting purposes comprising a flywheel co-axial with a rotary part of the engine and having associated therewith a clutch by which the flywheel can be connected to and disconnected from such rotary part of the engine, and means for imparting rotation to the flywheel when the clutch is disengaged so that when the clutch is subsequently engaged to connect the flywheel to the rotary part of the engine the momentum of the rotating flywheel imparts rotation to the rotary parts of the engine.

For convenience herein rotation of the rotary parts of the engine will be referred as usual as rotation of the engine.

In internal combustion engines of the above kind as hitherto proposed, engagement and disengagement of the clutch has been effected by a manually operated mechanical linkage and the object of the present invention is to provide an improved arrangement which will be more convenient and satisfactory.

To this end an internal combustion engine of the above kind according to the present invention has apparatus for rotating it for starting purposes comprising in association with the flywheel disposed co-axially with a rotary part of the engine, the clutch by which the flywheel can be connected to and disconnected from such rotary part of the engine at will and the means for rotating the flywheel when the clutch is disengaged a hydraulically operated member for controlling the engagement and disengagement of the clutch arranged to be moved under the influence of variations in the pressure acting thereon and manually operated mechanism for varying the pressure acting on the hydraulically operated member so as to control the clutch.

Preferably, as in a known arrangement the flywheel is disposed co-axially with the crankshaft and constitutes the engine flywheel. A hydraulic piston and cylinder assembly is disposed co-axially with the crankshaft with the axially movable hydraulically operated member thereof operatively connected to mechanism for engaging and disengaging the clutch. Thus the hydraulically operated member is conveniently the piston of such an assembly which moves within a cylinder formed within the crankshaft (which term is to be interpreted as including a co-axial extension of the crankshaft, that is a member formed integral with or rigidly mounted upon the end of the crankshaft).

Preferably the clutch is constructed and arranged so as to engage automatically when the fluid pressure acting on the hydraulically operated member is low and to be disengaged by an increase in such hydraulic pressure. Thus the means for causing engagement of the clutch may comprise merely a valve for relieving the pressure acting on the hydraulically operated member. In such a case the means for increasing the hydraulic pressure to disengage the clutch conveniently comprises or includes a manually operated pump but may include also a pressure accumulator of the air bottle or other type in which a supply of liquid under pressure derived for example from the engine lubricating system during normal operation can be built up and stored so as to be available for causing disengagement of the clutch at a subsequent time.

The details of construction may vary considerably, but one construction according to the invention is illustrated by way of example in the accompanying drawings in which.

Figure 1:
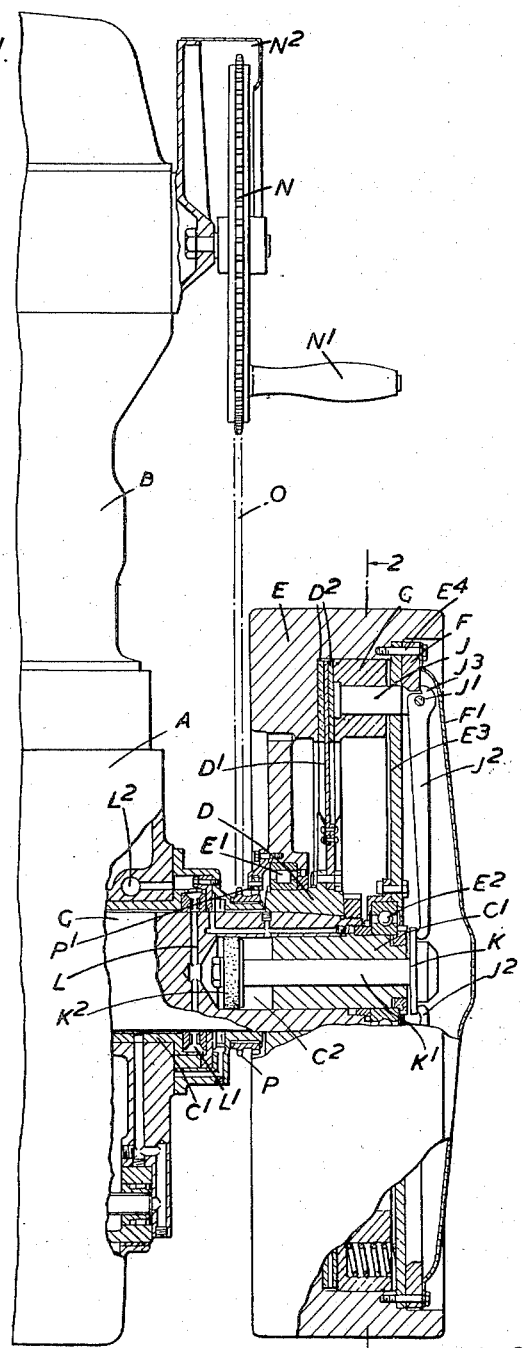
Figure 1 is a side elevation partly in section showing the construction and arrangement of the flywheel, the clutch and the mechanism associated therewith.
Figure 2:
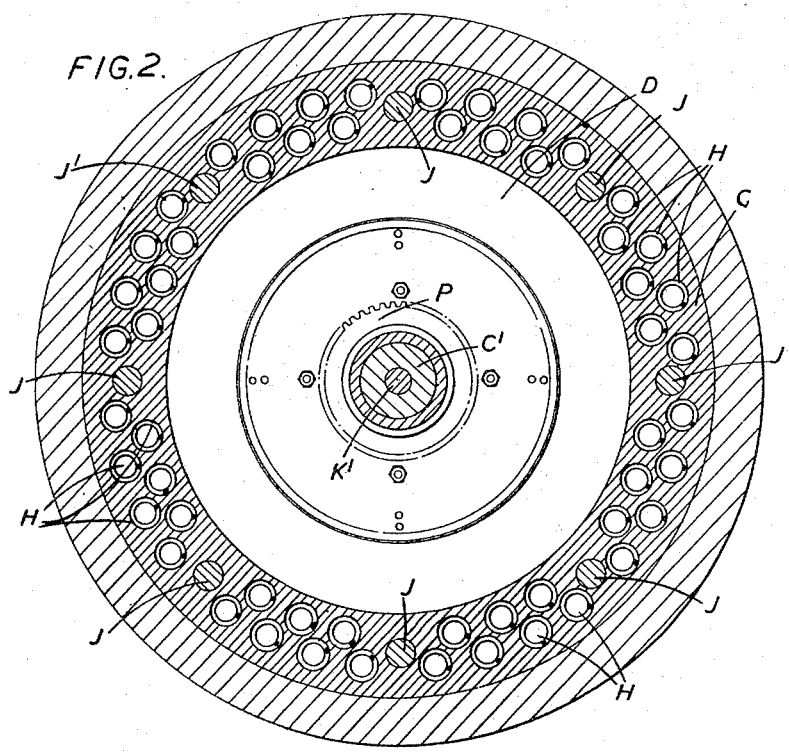
Figure 2 is a section on the line 2—2 of Figure 1.

In the construction illustrated in Figure 1, the engine comprises a crank case, indicated at A, carrying one or more cylinders indicated at B and having a crankshaft C supported therein in bearings $C^1$ in the usual manner. Rigidly secured to the projecting end of the crankshaft C is a boss D carrying a clutch plate $D^1$ having friction material $D^2$ on its faces while a flywheel E is supported from the crankshaft C upon bearings $E^1$, $E^2$ carried respectively by the boss D and by an extension $C^1$ secured partly within and projecting from a cylindrical bore $C^2$ formed within the end of the crankshaft. The bearing $E^2$ supports the flywheel through a disc $E^3$, the rim of which is rigidly secured to the flywheel by bolts $E^4$ which also secure in place a pad F, the function of which will be hereinafter described, and a cover plate $F^1$.

Mounted to slide within a large diameter bore in the flywheel is a clutch pressure ring G, the face of which is arranged to engage the friction material $D^2$ on one face of the disc $D^1$ so as also to press the friction material $D^2$ on the other face of this disc into engagement with a friction face within the flywheel. A series of springs H in bores within the member G and compressed between the bases of these bores and the disc $E^3$ serve normally to maintain the disc $D^1$ and its frictional material $D^2$ normally gripped between the member G and the friction face on the flywheel so that the clutch formed by these parts is engaged. To enable the clutch to be disengaged when desired, the pressure ring G has connected thereto light tension rods J to each of which is pivoted at $J^1$ a lever $J^2$, one end of which is formed with a lip $J^3$ engaging the edge of the pad F, while its other end bears on a thrust ring K connected through a thrust race to the outer end of a piston rod $K^1$ the inner end of which carries a piston $K^2$ arranged to move within the cylindrical bore $C^2$ and preferably of the cup leather type. It will thus be seen that if the piston $K^2$ is moved to the right in Figure 1, the levers $J^2$ will act through the members J to move the pressure ring G to the right against the action of the springs H and thus release the clutch in a generally known manner.

The piston $K^2$ and cylinder $C^2$ constitute a hydraulic piston assembly for controlling the clutch. To this end the left-hand of the bore $C^2$ communicates with hydraulic fluid passages L communicating with a transfer recess $L^1$ in a member surrounding the crank shaft which in turn communicates with means whereby hydraulic fluid under pressure can be admitted to or released from the left-hand end of the cylinder $C^2$.

Figure 3:
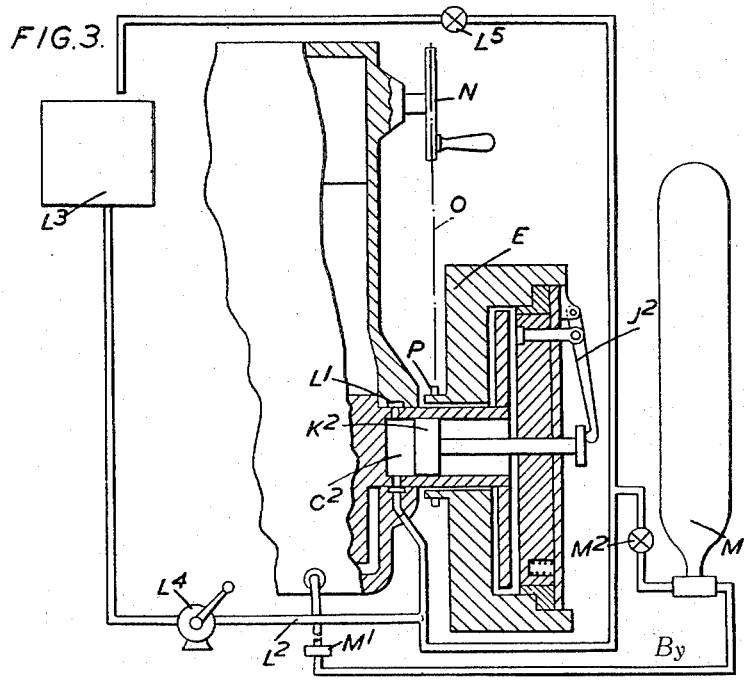
Figure 3 is a diagrammatic view partly in section illustrating the hydraulic system associated with the mechanism.

Thus as indicated in Figure 3, the transfer recess $L^1$ communicates with a passage $L^2$ to which hydraulic fluid under pressure can be delivered from a reservoir $L^3$ by a manually operated pump $L^4$ and from which it can be released by a manually operated relief valve $L^5$.

Thus by operating the pump $L^4$ hydraulic fluid can be delivered to the left-hand end of the cylinder $C^2$ to cause the piston $K^2$ to move to the right and disengage the clutch after which by opening the valve $L^5$ the hydraulic fluid can be released to permit engagement of the clutch.

If desired, in addition a pressure accumulator, for example of the air bottle type, may be provided as indicated at M and conected through a non-return valve indicated at $M^1$ to the pressure side of the lubricating system of the internal combustion engine so that a supply of fluid under pressure is automatically accumulated in the air bottle during operation of the engine to be available for supply to the cylinder $C^2$ when next the disengagement of the clutch is desired. Thus, a second manually operated valve $M^2$ would in this case be provided to control the supply of hydraulic liquid from the bottle M to the cylinder $C^2$ when desired.

Rotatably mounted on the cylinder B is a chain sprocket N having a handle $N^1$ for rotating it by hand and partially surrounded by a guard $N^2$, this sprocket being connected by a transmission chain O to a second sprocket P arranged as a freewheel and driving the flywheel E through pawls $P^1$ so that rotation can be imparted to the flywheel manually by rotation of the sprocket N.

The operation of the apparatus is as follows:

When the engine is to be started the pump $L^4$ is operated while the valve $L^5$ is closed so as to build up hydraulic pressure in the passage $L^2$ and hence in the left-hand end of the cylinder $C^2$ so as to move the piston $K^2$ to the right to disengage the clutch.

The sprocket N is now rotated by hand so as to impart rotation to the flywheel E at an appropriate speed. When the flywheel G is rotating at an appropriate speed, the operator opens the valve $L^5$ to release the pressure in the pipe $L^2$ and hence the cylinder $C^2$ to permit the clutch to engage whereupon the momentum of the flywheel imparts rotation to the crankshaft C.

If the hydraulic pressure accumulator indicated at M in Figure 3, of the accompanying drawings is provided, the valve $M^2$ would normally be maintained closed during operation of the engine so that oil under pressure from the lubricating system of the engine would be delivered through the non-return valve $M^1$ to and accumulate in the air bottle M. When the engine stopped the oil under pressure thus accumulated would be retained by the non-return valve $M^1$ and, when the engine was next to be started, the opening of the valve $M^2$ would cause pressure to be transferred to the pipe $L^2$ and cylinder $C^2$ to disengage the clutch, preparatory to rotating the flywheel E, without operation of the hand pump $L^4$.

It will thus be seen that in any case, after rotation has been given to the flywheel the operator only has to open a valve to cause engagement of the clutch. Thus the valve can be in any convenient position in relation to the other controls or to the position to be occupied by the operator during the starting process, for example adjacent to the sprocket N so as to be convenient to the operator's hand when he completes the operation of imparting rotation to the flywheel.

What I claim as my invention and desire to secure by Letters Patent is:

1. The combination with an internal combustion engine having a pressure lubricating system and a rotary part, of a flywheel disposed coaxially with said rotary part, a clutch by which said flywheel can be connected to said rotary part, resilient means connected with said clutch for engaging the clutch, a hydraulically operated member connected with said clutch and operative on increase in the hydraulic pressure applied thereto to disengage the clutch, means for rotating the flywheel when the clutch is disengaged, a hydraulic accumulator, means connecting the pressure lubricating system to the accumulator to charge same with oil under pressure, means affording a passage between said accumulator and said hydraulically operated member, and a manually controlled valve in said passage for admitting oil under pressure to said member to disengage the clutch.

2. The combination with an internal combustion engine having a pressure lubricating system and a rotary part, of a flywheel disposed coaxially with said rotary part, a clutch by which the flywheel can be connected to the rotary part, resilient means connected with said clutch for engaging the clutch, a hydraulically operated member connected with said clutch and operative on increase in the hydraulic pressure applied thereto to disengage the clutch, means for rotating the flywheel during disengagement of the clutch, communicating passages between said pressure lubricating system and said hydraulically operated member for supplying fluid under pressure to the latter, and valve means in said passages for controlling fluid flow therein.

3. The combination set forth in claim 2 in which the clutch is provided with release members the inner ends of which lie adjacent to the axis of rotation of the flywheel and clutch, and in which said hydraulically operated member comprises a cylinder coaxial with said flywheel and clutch, a piston in said cylinder, and connections between said cylinder and said release members to disengage said clutch in response to displacement of said piston.

HARRY RALPH RICARDO.

REFERENCES CITED

The following references are of record in the file of this patent:

UNITED STATES PATENTS

| Number | Name | Date |
|---|---|---|
| 1,418,449 | Meeder | June 6, 1922 |
| 1,424,987 | Clark | Aug. 8, 1922 |
| 1,434,309 | Nelson | Aug. 31, 1922 |
| 1,847,784 | Procunier et al. | Mar. 1, 1932 |

FOREIGN PATENTS

| Number | Country | Date |
|---|---|---|
| 871,449 | France | Jan. 15, 1942 |